United States Patent
Kobayashi et al.

(10) Patent No.: US 9,537,176 B2
(45) Date of Patent: Jan. 3, 2017

(54) MATERIAL FOR NON-AQUEOUS ELECTROLYTE SECONDARY BATTERY NEGATIVE ELECTRODE

(71) Applicants: Kureha Corporation, Tokyo (JP); Kureha Battery Materials Japan Co., Ltd., Tokyo (JP)

(72) Inventors: Tetsuhiro Kobayashi, Tokyo (JP); Shota Kobayashi, Tokyo (JP); Takashi Wakahoi, Tokyo (JP); Yasuhiro Tada, Tokyo (JP); Naohiro Sonobe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 40 days.

(21) Appl. No.: 14/416,107

(22) PCT Filed: Aug. 30, 2013

(86) PCT No.: PCT/JP2013/073436
§ 371 (c)(1),
(2) Date: Jan. 21, 2015

(87) PCT Pub. No.: WO2014/038494
PCT Pub. Date: Mar. 13, 2014

(65) Prior Publication Data
US 2015/0171470 A1  Jun. 18, 2015

(30) Foreign Application Priority Data
Sep. 6, 2012 (JP) ................. 2012-196566

(51) Int. Cl.
*H01M 4/583* (2010.01)
*H01M 10/0567* (2010.01)
*H01M 4/133* (2010.01)
*H01M 4/587* (2010.01)
*H01M 4/62* (2006.01)
*H01M 10/052* (2010.01)
*H01M 10/0525* (2010.01)

(52) U.S. Cl.
CPC ......... *H01M 10/0567* (2013.01); *H01M 4/133* (2013.01); *H01M 4/583* (2013.01); *H01M 4/587* (2013.01); *H01M 4/622* (2013.01); *H01M 4/625* (2013.01); *H01M 10/052* (2013.01); *H01M 10/0525* (2013.01); *H01M 2220/20* (2013.01); *H01M 2300/0025* (2013.01); *Y02E 60/122* (2013.01); *Y02T 10/7011* (2013.01)

(58) Field of Classification Search
CPC .. H01M 4/133; H01M 4/587; H01M 10/0567; H01M 4/625; H01M 10/052
See application file for complete search history.

(56) References Cited

U.S. PATENT DOCUMENTS

| 5,616,436 | A | 4/1997 | Sonobe et al. |
| 5,741,472 | A | 4/1998 | Sonobe et al. |
| 6,303,249 | B1* | 10/2001 | Sonobe ................. H01M 4/133 429/231.4 |
| 6,335,122 | B1 | 1/2002 | Yamada et al. |
| 6,399,255 | B2 | 6/2002 | Herreyre et al. |
| 2003/0118908 | A1 | 6/2003 | Ishikawa et al. |

(Continued)

FOREIGN PATENT DOCUMENTS

| CN | 1945875 A | 4/2007 |
| CN | 102237526 A | 11/2011 |

(Continued)

OTHER PUBLICATIONS

Notification of First Office Action issued May 5, 2016, in Chinese Patent Application No. 201380029378.8, with English translation.

(Continued)

*Primary Examiner* — Stewart Fraser
(74) *Attorney, Agent, or Firm* — Birch, Stewart, Kolasch & Birch, LLP

(57) ABSTRACT

An object of the present invention is to provide a material for non-aqueous electrolyte secondary battery negative electrodes containing a graphitic material and a non-graphitizable carbonaceous material, the material having excellent resistance against deterioration due to moisture absorption and excellent charge/discharge cycle resistance; a non-aqueous electrolyte secondary battery negative electrode using the same; and a non-aqueous electrolyte secondary battery using these, that has low resistance and excellent cycle durability.

The present invention comprises a carbonaceous material obtained by carbonizing a plant-derived organic material having a potassium content of 0.5% by mass or less, an average particle size $D_{v50}$ of 2 μm to 50 μm, an average interlayer spacing of (002) plane determined by powder X-ray diffraction of 0.365 nm to 0.400 nm, an atomic ratio (H/C) of hydrogen atoms to carbon atoms determined by elemental analysis of 0.1 or less, and a true density determined by a pycnometer method using butanol of 1.51 g/cm$^3$ or greater but 1.65 g/cm$^3$ or less; and a graphitic material having an average interlayer spacing determined by powder X-ray diffraction of 0.345 nm or less, and a true density determined by a pycnometer method using butanol of 1.9 g/cm$^3$ or greater.

12 Claims, No Drawings

(56) References Cited

U.S. PATENT DOCUMENTS

| | | | |
|---|---|---|---|
| 2010/0226069 A1* | 9/2010 | Norieda | H01G 9/016 361/502 |
| 2012/0064403 A1 | 3/2012 | Kameda et al. | |
| 2012/0077020 A1* | 3/2012 | Muramatsu | B82Y 30/00 428/319.1 |

FOREIGN PATENT DOCUMENTS

| | | |
|---|---|---|
| CN | 102362380 A | 2/2012 |
| JP | 08-064207 A | 3/1996 |
| JP | 08-115723 A | 5/1996 |
| JP | 10-284089 A | 10/1998 |
| JP | 2000-182670 A | 6/2000 |
| JP | 2003-142075 A | 5/2003 |
| JP | 2006-338977 A | 12/2006 |
| JP | 2009-238681 A | 10/2009 |
| JP | 2013-534024 A | 8/2013 |
| WO | 2011/157013 A1 | 12/2011 |

OTHER PUBLICATIONS

International Search Report of PCT/JP2013/073436 dated Dec. 3, 2013.

Notification of Reason for Refusal issued Jan. 18, 2016, in Korean Patent Application No. 10-2014-7034917, with English translation.

Notification of Reason for Final Refusal issued Jul. 15, 2016, in Korean Patent Application No. 10-2014-7034917, with English Translation.

Notice of Decision of Refusal issued Nov. 3, 2016, in Korean Patent Application No. 10-2014-7034917, with English translation.

* cited by examiner

MATERIAL FOR NON-AQUEOUS ELECTROLYTE SECONDARY BATTERY NEGATIVE ELECTRODE

TECHNICAL FIELD

The present invention relates to an electrode for a non-aqueous electrolyte secondary battery negative electrode containing a carbonaceous material and graphite.

BACKGROUND ART

In recent years, the notion of mounting large lithium-ion secondary batteries, having high energy density and excellent output characteristics, in electric vehicles has been investigated in response to increasing concern over environmental issues. In small mobile device applications such as mobile telephones or laptop computers, the capacity per unit volume is important, so graphitic materials with a large density have primarily been used as negative electrode active materials. However, since lithium-ion secondary batteries for vehicles are large and expensive and thus it is difficult to replace the lithium-ion secondary batteries while using the vehicle, the lithium-ion secondary batteries for vehicles are required to have at least the same durability as that of vehicles and demanded to have a product life of 10 years or longer (high durability).

When graphitic materials or carbonaceous materials with a developed graphite structure are used, there is a tendency for damage to occur due to crystal expansion and contraction caused by repeated lithium doping and de-doping, which diminishes the charge/discharge repetition performance. Therefore, such materials are not suitable as negative electrode materials for lithium-ion secondary batteries for vehicles which require high cycle durability.

In contrast, non-graphitizable carbon is suitable for use in automobile applications from the perspective of involving little particle expansion and contraction due to lithium doping and de-doping and having high cycle durability (Patent Document 1). Therefore, there has been an attempt to use graphitic material and non-graphitizable carbon by mixing as negative electrode active materials, and lithium-ion secondary batteries having excellent cycle durability has been obtained (Patent Document 2).

CITATION LIST

Patent Literature

Patent Document 1: Japanese Unexamined Patent Application Publication No. H08-064207A
Patent Document 2: Japanese Unexamined Patent Application Publication No. 2006-338977A

SUMMARY OF INVENTION

Technical Problem

An object of the present invention is to provide a material for non-aqueous electrolyte secondary battery negative electrodes containing a graphitic material and a non-graphitizable carbonaceous material, the material having excellent resistance against deterioration due to moisture absorption and excellent charge/discharge cycle resistance; and a non-aqueous electrolyte secondary battery negative electrode using the same. Furthermore, another object of the present invention is to provide a non-aqueous electrolyte secondary battery using these, that has low resistance and excellent cycle durability.

Solution to Problem

As a result of diligent research on an active material for negative electrodes, the present inventors have found that the carbonaceous material for negative electrodes having a particular content of potassium, average particle size, average interlayer spacing of (002) plane, atomic ratio of hydrogen atoms to carbon atoms, and true density exhibits little deterioration in an exposure test even when used together with graphite since the carbonaceous material for negative electrodes has low moisture absorbency even though it is a non-graphitizable carbonaceous material. Therefore, the present inventors has completed the present invention.

In general, since non-graphitizable carbons have larger numbers of holes compared to graphitizable carbons, the non-graphitizable carbons easily absorb moisture. Carbonaceous material used in the present invention have low moisture absorbency because of having particular physical properties. Thereby, it is possible to use the graphitic material and the non-graphitizable carbon by mixing in order to optimize charge/discharge characteristics and cycle characteristics. Therefore, deterioration of characteristics due to moisture absorption from the atmosphere while producing the battery does not occur.

Furthermore, in general, an electrode active material is coated on a current collecting board using a binder and then formed into a predetermined shape such as a tape shape. At this time, the electrode active material is used as in the form of slurry or paste by using organic solvent or water. Since conventional non-graphitizable carbons easily absorb moisture, highly absorbent water-soluble polymers could not be used as binders. Carbonaceous material used in the present invention have low moisture absorbency because of having particular physical properties. Therefore, when using the graphitic material and the non-graphitizable carbon by mixing as negative electrode active materials, a water-soluble polymer can be used as a binder and thus makes it possible to provide a non-aqueous electrolyte secondary battery having low resistance and excellent cycle durability.

Therefore, the present invention relates to the following.

[1] A material for non-aqueous electrolyte secondary battery negative electrodes comprising a carbonaceous material and a graphitic material;
the carbonaceous material being a carbonaceous material obtained by carbonizing a plant-derived organic material, and having a potassium content of 0.5% by mass or less, an average particle size $D_{v50}$ of 2 μm or greater but 50 μm or less, an average interlayer spacing of (002) plane determined by powder X-ray diffraction of 0.365 nm or greater but 0.400 nm or less, an atomic ratio (H/C) of hydrogen atoms to carbon atoms determined by elemental analysis of 0.1 or less, and a true density determined by a pycnometer method using butanol of 1.51 g/cm$^3$ or greater but 1.65 g/cm$^3$ or less; and
the graphitic material having an average interlayer spacing determined by powder X-ray diffraction of 0.345 nm or less, and a true density determined by a pycnometer method using butanol of 1.9 g/cm$^3$ or greater.

[2] The material for non-aqueous electrolyte secondary battery negative electrodes according to [1], wherein a calcium content of the carbonaceous material is 0.02% by mass or less.

[3] The material for non-aqueous electrolyte secondary battery negative electrodes according to [1] or [2], wherein the plant-derived organic material contains coffee bean-derived organic material.

[4] The material for non-aqueous electrolyte secondary battery negative electrodes according to any one of [1] to [3], wherein the carbonaceous material has a ratio ($\rho_H/\rho_{Bt}$) of the true density determined by the pycnometer method using butanol ($\rho_{Bt}$) to a true density determined by a dry density measurement method using helium ($\rho_H$) of 1.18 or greater but 1.38 or less.

[5] A negative electrode for non-aqueous electrolyte secondary batteries comprising the material for non-aqueous electrolyte secondary battery negative electrodes described in any one of [1] to [4].

[6] The negative electrode for non-aqueous electrolyte secondary batteries according to [5], further comprising a water-soluble polymer.

[7] The negative electrode for non-aqueous electrolyte secondary batteries according to [6], wherein the water-soluble polymer is a polymer containing conjugated diene or acrylic ester as a constituent unit.

[8] The negative electrode for non-aqueous electrolyte secondary batteries according to [6] or [7], wherein the water-soluble polymer is a carboxymethyl cellulose derivative, a polyvinyl alcohol derivative, or a polyacrylate.

[9] A non-aqueous electrolyte secondary battery comprising the negative electrode for non-aqueous electrolyte secondary batteries described in any one of [5] to [8].

[10] The non-aqueous electrolyte secondary battery according to [9], further comprising, in an electrolyte solution, an additive having a value of LUMO, determined by AM1 calculation method of quantum chemical calculation methods, in a range of −1.1 eV or greater but 1.11 eV or less.

[11] The non-aqueous electrolyte secondary battery according to [10], the additive is vinylene carbonate, fluoroethylene carbonate, trimethylsilyl phosphate, lithium tetrafluoroborate, chloroethylene carbonate, propane sultone, ethylene sulfite, dioxathiolane dioxide, or lithium bis(oxalato)borate.

[12] A vehicle on which the non-aqueous electrolyte secondary battery described in any one of [9] to [11] is mounted.

Advantageous Effects of Invention

The carbonaceous material for negative electrodes of the present invention having a particular content of potassium, average particle size, average interlayer spacing of (002) plane, atomic ratio of hydrogen atoms to carbon atoms, and true density exhibits little deterioration in charge/discharge characteristics in an exposure test even when used together with graphite since the carbonaceous material for negative electrodes has low moisture absorbency even though it is a non-graphitizable carbonaceous material.

DESCRIPTION OF EMBODIMENTS

Hereinafter, embodiments of the present invention will be described.

[1] Material for Non-Aqueous Electrolyte Secondary Battery Negative Electrodes

The material for negative electrode of the present invention is a material for non-aqueous electrolyte secondary battery negative electrodes comprising a carbonaceous material and a graphitic material; the carbonaceous material being a carbonaceous material obtained by carbonizing a plant-derived organic material, and having a potassium content of 0.5% by mass or less, an average particle size $D_{v50}$ of 2 μm to 50 μm, an average interlayer spacing of (002) plane determined by powder X-ray diffraction of 0.365 nm to 0.400 nm, an atomic ratio (H/C) of hydrogen atoms to carbon atoms determined by elemental analysis of 0.1 or less, and a true density determined by a pycnometer method using butanol of 1.51 g/cm³ or greater but 1.65 g/cm³ or less; and the graphitic material having an average interlayer spacing determined by powder X-ray diffraction of 0.345 nm or less, and a true density determined by a pycnometer method using butanol of 1.9 g/cm³ or greater.

I. Carbonaceous Material

The carbonaceous material used in the present invention contains a non-graphitizable carbonaceous material of which the carbon source is a plant-derived organic material. The non-graphitizable carbon cause small expansion and contraction of particles when subjected to doping and de-doping reaction of lithium, and has high cycle durability. Such a plant-derived organic material will be described in detail in the explanation of the production method of the present invention.

The plant-derived organic material contains alkali metals (e.g. potassium and sodium), alkaline earth metals (e.g. magnesium and calcium), transition metals (e.g. iron and copper), and other elements, and the content of these metals are preferably reduced. This is because, if the plant-derived carbonaceous material contains these metals, it is highly possible that impurities leach out from the negative electrode into the electrolyte solution during de-doping and negatively affect the battery performances and safety.

The content of potassium element in the carbonaceous material used in the present invention is 0.5% by mass or less, more preferably 0.2% by mass or less, and even more preferably 0.1% by mass or less. In a non-aqueous electrolyte secondary battery using a carbonaceous material for negative electrodes having the potassium content exceeding 0.5% by mass, decrease in de-doping capacity and increase in non-de-doping capacity may occur.

The content of calcium in the carbonaceous material used in the present invention is 0.02% by mass or less, more preferably 0.01% by mass or less, and even more preferably 0.005% by mass or less. In a non-aqueous electrolyte secondary battery using a carbonaceous material for negative electrodes having a large calcium content, heat build-up may be caused by minute short-circuit. Furthermore, doping characteristics and de-doping characteristics may also be negatively affected.

Although the halogen content in the carbonaceous material that has been subjected to heat treatment using a halogen gas-containing non-oxidizing gas is not limited, the halogen content is from 50 to 10000 ppm, more preferably from 100 to 5000 ppm, and further preferably from 200 to 3000 ppm.

Therefore, the present invention is a material for non-aqueous electrolyte secondary battery negative electrodes comprising a carbonaceous material and a graphitic material; the carbonaceous material being a carbonaceous material obtained by carbonizing a plant-derived organic material, and having a potassium content of 0.5% by mass or less, a halogen content of 50 to 10000 ppm, an average particle size $D_{v50}$ of 2 μm to 50 μm, an average interlayer spacing of (002) plane determined by powder X-ray diffraction of 0.365 nm to 0.400 nm, an atomic ratio (H/C) of hydrogen atoms to carbon atoms determined by elemental analysis of 0.1 or less, and a true density determined by a pycnometer method using butanol of 1.51 g/cm³ or greater but 1.65 g/cm³ or less; and the graphitic material having an average interlayer spacing determined by powder X-ray diffraction of 0.345 nm or less, and a true density determined by a pycnometer method using butanol of 1.9 g/cm³ or greater.

The average particle size (volume average particle size: $D_{v50}$) of the carbonaceous material used in the present invention is preferably from 2 to 50 μm. When the average particle size is less than 2 μm, the specific surface area increases due to increase in fine powder, and the irreversible capacity, which is a capacity that is charged but not discharged, also increases due to increase in reactivity with the electrolyte solution, thereby increasing the proportion of wasted positive electrode capacity. Thus, this is not preferable. In addition, when producing a negative electrode, each cavity formed between the carbonaceous materials becomes small, and the movement of lithium in the electrolyte solution is suppressed, which is not preferable. The lower limit of the average particle size is preferably 2 μm or greater, more preferably 3 μm or greater, and particularly preferably 4 μm or greater. On the other hand, when the average particle size is 50 μm or less, the diffusion free path of lithium within particles decreases, which makes it possible to charge and discharge rapidly. Furthermore, in the case of a lithium-ion secondary battery, increasing the electrode area is important for improving the input/output characteristics, so it is necessary to reduce the coating thickness of the active material on the current collector at the time of electrode preparation. In order to reduce the coating thickness, it is necessary to reduce the particle size of the active material. From this perspective, the upper limit of the average particle size is preferably 50 μm or less, more preferably 40 μm or less, even more preferably 30 μm or less, yet even more preferably 25 μm or less, and most preferably 20 μm or less.

The average interlayer spacing of the (002) plane of a carbonaceous material indicates a value that decreases as the crystal integrity increases. The spacing of an ideal graphite structure yields a value of 0.3354 nm, and the value tends to increase as the structure is disordered. Therefore, the average interlayer spacing is effective as an index indicating the carbon structure. The average interlayer spacing of (002) plane determined by X-ray diffraction using the carbonaceous material for the non-aqueous electrolyte secondary battery of the present invention is 0.365 nm or greater, more preferably 0.370 nm or greater, and even more preferably 0.375 nm or greater. Similarly, the average interlayer spacing above is 0.400 nm or less, preferably 0.395 nm or less, and more preferably 0.390 nm or less. If the interlayer spacing of (002) plane is less than 0.365 nm, when the carbonaceous material is used as a negative electrode of a non-aqueous electrolyte secondary battery, doping capacity will be small or repeating properties will be poor because expansion and contraction involving doping and de-doping of lithium become large and thus electric conductivity network among the particles is cutoff due to cavities caused among the particles. Therefore, such a carbonaceous material is not, in particular, preferable for use in automobiles. Furthermore, if the interlayer spacing of (002) plane exceeds 0.400 nm, non-de-doping capacity will be large, which is not preferable.

The H/C ratio of the carbonaceous material used in the present invention was determined by measuring hydrogen atoms and carbon atoms by elemental analysis. Since the hydrogen content of the carbonaceous material decreases as the degree of carbonization increases, the H/C ratio tends to decrease. Therefore, the H/C ratio is effective as an index expressing the degree of carbonization. Although the H/C ratio of the carbonaceous material of the present invention is not limited, the H/C ratio is 0.1 or less and more preferably 0.08 or less. The H/C ratio is particularly preferably 0.05 or less. When the H/C ratio of hydrogen atoms to carbon atoms exceeds 0.1, the amount of functional groups present in the carbonaceous material increases, and the irreversible capacity can increase due to a reaction with lithium. Therefore, this is not preferable.

The true density of a graphitic material having an ideal structure is 2.2 g/cm³, and the true density tends to decrease as the crystal structure becomes disordered. Therefore, the true density can be used as an index expressing the carbon structure. The true density of the carbonaceous material of the present invention is 1.51 g/cm³ or greater, and more preferably 1.53 g/cm³ or greater. Carbon material having the true density of less than 1.51 g/cm³ tends to deteriorate due to moisture absorption and is not suitable for a combined use with graphite. Furthermore, the electrode density decreases and thus causes a decrease in the volume energy density, which is not preferable. The true density of the carbonaceous material of the present invention is 1.65 g/cm³ or less, and more preferably 1.62 g/cm³ or less. If the true density of the carbonaceous material exceeds 1.65 g/cm³, since durability will be poor due to the large extraction and contraction of particles caused by doping and de-doping of lithium, and since the demerits of graphite cannot be sufficiently made up for, this is not preferable.

The true density of the carbonaceous material used in the present invention is such that, in particular, the ratio ($\rho_H/\rho_{Bt}$) of the true density determined by the pycnometer method using butanol ($\rho_{Bt}$) to the true density determined by the dry density measurement method using helium ($\rho_H$) is preferably from 1.18 to 1.38. In the present invention, the lower limit of the ratio of the true densities is preferably 1.18 or greater, and more preferably 1.20 or greater. If the value of the ratio is below the lower limit, discharging capacity will be low. Furthermore, the upper limit is preferably 1.38 or less, more preferably 1.32 or less, and further preferably 1.30 or less. If the value of the ratio exceeds the upper limit, the demerits of graphite cannot be sufficiently made up for because irreversible capacity will be large.

(Removal of Fine Powder)

The carbonaceous material used in the present invention is preferably a carbonaceous material in which fine powder is removed. When a carbonaceous material in which fine powder is removed is used as a negative electrode of a non-aqueous electrolyte secondary battery, irreversible capacity decreases and charge/discharge efficiency will be enhanced. In the case of using a carbonaceous material containing a little amount of fine powder, active materials can be sufficiently adhered even when using a little amount of a binder. That is, a carbonaceous material containing a large amount of fine powder cannot sufficiently adhere fine powders, and this may lead to poor long-term durability.

The amount of the fine powder contained in the carbonaceous material of the present invention is not particularly limited; however, for cases where the average particle size is from 2 to 50 μm, a proportion of particles of 1 μm or less is preferably 2% by volume or less, more preferably 1% by volume or less, and even more preferably 0.5% by volume or less. When a carbonaceous material in which the proportion of particles of 1 μm or less is greater than 2% by volume is used, irreversible capacity of the obtained battery will be large, and cycle durability may be poor. Furthermore, for cases where the average particle size is from 1 to 8 μm (preferably, the average particle size of 2 to 10 μm), although it is not limited, the proportion of the particles of 1 μm or less is preferably 10% by volume or less, more preferably 8% by volume or less, and even more preferably 6% by volume or less. When a carbonaceous material in which the proportion of particles of 1 μm or less is greater than 10% by volume is used, irreversible capacity of the obtained battery will be large, and cycle durability may be poor.

(Specific Surface Area)

The specific surface area (hereinafter, also referred to as "SSA") determined by the BET method using a nitrogen adsorption of the carbonaceous material used in the present invention is not limited; however, the specific surface area is preferably 13 $m^2/g$ or less, more preferably 12 $m^2/g$ or less, and even more preferably 10 $m^2/g$ or less, and yet even more preferably 8 $m^2/g$ or less, and most preferably 7.0 $m^2/g$ or less. When a carbonaceous material having the SSA of greater than 13 $m^2/g$ is used, irreversible capacity of the obtained battery can be large. Furthermore, the lower limit of the specific surface area is preferably 1 $m^2/g$ or greater, more preferably 1.5 $m^2/g$ or greater, and even more preferably 2 $m^2/g$ or greater. When a carbonaceous material having the SSA of less than 1 $m^2/g$ is used, discharging capacity of the battery can be small.

II. Graphitic Material

As the graphitic material used in the negative electrode of the present invention, it is essential to use a graphitic material having a high crystallinity, that is, the average interlayer spacing of (002) plane determined by wide-angle X-ray diffraction of 0.345 nm or less, and the true density determined by a pycnometer method using butanol of 1.9 $g/cm^3$ or greater. Although the particle size of the graphitic material is not particularly limited, typically, the particle size is roughly from 1 to 500 μm, and more preferably roughly from 10 to 100 μm. The theoretical capacity of the graphite is 372 mAh/g. If the average interlayer spacing and the true density are within the ranges described above, the graphitic material exhibits a capacity close to the theoretical capacity of the graphite.

In terms of the material properties of the graphitic material, a graphitic material that can dope and release lithium-ion as a negative electrode active material can be used, and the graphitic material is not particularly limited. For example, particulate (squamous and spherical) natural graphite, artificial graphite, mesocarbon microbeads, and the like can be used without limitation. Examples of the artificial graphite include artificial graphite that is formed by heat-treating tar or pitch eventually at 1500° C. or higher. Specifically, there are artificial graphite that is obtained by graphitizing mesophase heat-treated bodies, mesophase microspheres, mesophase carbon fibers, or cokes, that is formed by subjecting, as a raw material, petroleum-based or coal-based tar or pitch, that are considered to be graphitizable carbon materials, to a polycondensation, preferably at 1500° C. or higher, or more preferably at 2800 to 3300° C.

(Mass Ratio of Carbonaceous Material to Graphitic Material)

In the material for negative electrodes of the present invention, the mass ratio of the carbonaceous material to the graphitic material is not limited. That is, since the effect of the present invention can be obtained by mixing the carbonaceous material and the graphitic material, the mass ratio thereof is not limited. However, the upper limit of the carbonaceous material relative to the total mass of the carbonaceous material and the graphitic material is preferably 95% by mass or less, more preferably 90% by mass or less, and most preferably 85% by mass or less. The lower limit of the carbonaceous material is preferably 5% by mass or greater, more preferably 10% by mass or greater, and most preferably 15% by mass or greater. By setting the amount of the carbonaceous material to be from 5% by mass to 95% by mass, a large discharging capacity can be exhibited even after exposure test.

Furthermore, although the material for negative electrodes of the present invention may contain another substance, other than the carbonaceous material and the graphitic material, that can be used in a negative electrode as long as the effect of the material for negative electrodes of the present invention can be obtained, such a substance is preferably 30% by mass or less, and more preferably 10% by mass or less, relative to the total mass of the negative electrode substances.

[2] Method of Producing Carbonaceous Material for Non-Aqueous Electrolyte Secondary Battery Negative Electrodes Hereinafter, the method of producing the carbonaceous material used in the present invention will be described.

The method of producing the carbonaceous material is a method of producing the carbonaceous material using, as a raw material, a plant-derived organic material having an average particle size of 100 μm or greater, and comprising at least the steps of: (1) de-mineralizing using an acidic solution having a pH of 3.0 or less (hereinafter, also referred to as "liquid phase de-mineralizing step"), (2) pulverizing the de-mineralized organic material or carbonized material (carbonized material after de-tarring or carbonized material after final heat treatment) to the average particle size of 2 to 50 μm (hereinafter, also referred to as "pulverizing step"), and (4) heat treatment at 1000 to 1500° C. in a non-oxidation atmosphere (hereinafter, also referred to as "heat treatment step"). The method of producing the carbonaceous material for non-aqueous electrolyte secondary battery negative electrodes preferably comprises a step of (3) de-tarring the de-mineralized organic material at 300 to 1000° C. (hereinafter, also referred to as "de-tarring step"). Therefore, the method of producing the carbonaceous materials for non-aqueous electrolyte secondary battery negative electrodes of the present invention comprises the liquid phase de-mineralizing step (1), the pulverizing step (2), and the heat treatment step (4), and preferably further comprises the de-tarring step (3). Furthermore, the liquid phase de-mineralizing step (1) is preferably a treatment step in which a plant-derived organic material is treated in an acidic solution having a pH of 3.0 or less at 0° C. or greater but less than 80° C.

(Plant-Derived Organic Material)

In the plant-derived organic material that can be used in the present invention, a plant for the raw material is not particularly limited; however, examples of the plant for the raw material include coffee beans, coconut shells, tea leaves, sugar cane, fruits (tangerines or bananas), straw, broad-leaved trees, coniferous trees, bamboo, and rice hulls. These plant-derived organic materials may be respectively used alone or as a combination of two or more types of plant-derived organic materials. Among the plant-derived organic material, an extraction residue formed by extracting the coffee beverage component from coffee beans has undergone extraction/removal of some mineral components when the coffee component is extracted. Among these, industrially extracted coffee extraction residues are particularly preferable because these extraction residues are adequately pulverized and available in large quantity.

Since a carbonaceous material for negative electrodes produced by these plant-derived organic material can dope a large amount of lithium, the carbonaceous material is useful as a negative electrode material for non-aqueous electrolyte secondary batteries. However, the plant-derived organic material contains a large amount of metal elements and, in particular, contains large amount of potassium and calcium. Furthermore, the carbonaceous material produced from the plant-derived organic material containing a large amount of metal elements negatively affects electrochemical properties and safety when used as a negative electrode. Therefore, the content of potassium element and calcium element contained in the carbonaceous material for negative electrodes is preferably reduced as much as possible.

The plant-derived organic material is preferably a plant-derived organic material that has not undergone heat treatment at 500° C. or higher. In the case where the plant-derived organic material is heat-treated at 500° C. or higher, de-mineralizing may be insufficient due to carbonization of organic materials. The plant-derived organic material used in the present invention is preferably a plant-derived organic material that has not undergone heat treatment. For cases where the plant-derived organic material is heat-treated, the treatment is performed preferably at 400° C. or lower, more preferably at 300° C. or lower, and even more preferably at 200° C. or lower, and most preferably at 100° C. or lower. For example, in the case where an extraction residue of coffee beans is used as the raw material, the residue may have undergone non-carbonization heat treatment at approximately 200° C. when the coffee beans are roasted; however, the residue can be adequately used as the plant-derived organic material used in the present invention.

1. Liquid Phase De-Mineralizing Step

The liquid phase de-mineralizing step in the method of producing the carbonaceous material used in the present invention is a step of treating the plant-derived organic material in an acidic solution having a pH of 3.0 or less, prior to de-tarring. By this liquid phase de-mineralization, potassium element, calcium element, and the like can be effectively removed; and, in particular, compared to the case where acid is not used, calcium element can be efficiently removed. Furthermore, the liquid phase de-mineralization can remove other alkali metals and alkaline earth metals, as well as transition metals such as copper and nickel.

The acid used in the liquid phase de-mineralization is not particularly limited; however, examples of the acid include strong acids such as hydrochloric acid, hydrofluoric acid, sulfuric acid, and nitric acid, weak acids such as citric acid and acetic acid, and a mixture thereof. The acid is preferably hydrochloric acid or hydrofluoric acid.

The plant-derived organic material used in the present invention is preferably a plant-derived organic material that has not undergone heat treatment at 500° C. or higher. However, for cases where the carbonization of the organic material has been proceeded due to heat treatment at 500° C. or higher, the de-mineralization can be sufficiently performed by using hydrofluoric acid. For example, for cases where, after de-tarring a coffee extraction residue at 700° C., the coffee extraction residue was subjected to liquid phase de-mineralization using 35% hydrochloric acid for 1 hour, water washed three times and dried, then pulverized to 10 µm, and subjected to final heat treatment at 1250° C., 409 ppm of potassium and 507 ppm of calcium remained. On the other hand, for cases where a mixed solution of 8.8% hydrochloric acid and 11.5% hydrofluoric acid was used, the contents of potassium and calcium were less than or equal to the detection limit of X-ray fluorescence measurement (10 ppm or less).

The value of pH used in the liquid phase de-mineralization is not limited as long as sufficient de-mineralization is achieved; however, pH is preferably 3.0 or less, more preferably 2.5 or less, and even more preferably 2.0 or less. If the value of pH exceeds 3.0, it is inconvenient that the de-mineralization cannot be sufficiently performed.

The time period used in the liquid phase de-mineralization varies depending on the pH or treatment temperature and is not particularly limited; however, the time period is preferably from 5 minutes to 300 minutes, more preferably from 10 minutes to 200 minutes, and even more preferably from 30 minutes to 150 minutes. If the time period is too short, sufficient de-mineralization cannot be achieved, and if the time period is too long, it is disadvantageous from the perspective of operating efficiency.

In the liquid phase de-mineralization, the treatment temperature is from 0° C. to 100° C., preferably 80° C. or lower, more preferably 40° C. or lower, and even more preferably at room temperature (20° C. to 40° C.). If the treatment temperature is 100° C. or higher, true density of the carbonaceous material will decrease and, when used in a battery, discharging capacity and/or efficiency of the battery will be deteriorated. Furthermore, if the treatment temperature is less than 80° C., true density of the carbonaceous material will increase and, when used in a battery, discharging capacity and/or efficiency of the battery will be enhanced.

The liquid phase de-mineralizing step (1) is a step for removing potassium, calcium, and the like contained in the plant-derived organic material. The potassium content after the liquid phase de-mineralizing step (1) is preferably 0.5% by mass or less, more preferably 0.2% by mass or less, and even more preferably 0.1% by mass or less. Furthermore, the calcium content is preferably 0.02% by mass or less, more preferably 0.01% by mass or less, and even more preferably 0.005% by mass or less. If the potassium content exceeds 0.5% by mass and calcium content exceeds 0.02% by mass, a non-aqueous electrolyte secondary battery using the obtained carbonaceous material for negative electrodes not only causes decrease in de-doping capacity and increase in irreversible capacity but also causes a significant safety problem by causing short-circuit when these metal elements leach out into the electrolyte solution and reprecipitate.

The particle size of the plant-derived organic material used in the liquid phase de-mineralization is not particularly limited. However, if the particle size is too small, since the transparency of the solution during filtration after the de-mineralizing will decrease, the lower limit of the particle size is preferably 100 µm or greater, more preferably 300 µm or greater, and even more preferably 500 µm or greater. Furthermore, the upper limit of the particle size is preferably 10000 µm or less, more preferably 8000 µm or less, and even more preferably 5000 µm or less.

Although the mechanism of efficient removal of potassium, other alkali metals, alkaline earth metals, transition metals, and the like via the liquid phase de-mineralization is not clearly known, it is conceived as described below. It is conceived that, compared to the case where an organic material is heat-treated at 500° C. or higher, whereby carbonization proceeds and the organic material becomes hydrophobic, and thus liquid acid does not permeate into the organic material, in the case where an organic material is not heat-treated, the organic material is hydrophilic and thus, when the liquid acid permeates into the organic material, potassium and similar metals contained in the plant-derived organic material is precipitated as chloride and the like and removed by water-washing. However, the present invention is not limited to the above description.

2. Pulverizing Step

The pulverizing step of the method of producing the carbonaceous material used in the present invention is a step of pulverizing the plant-derived organic material, the organic material in which potassium and calcium have been removed, or the carbonized material in a manner such that the average particle size after heat treatment becomes 2 to 50 µm. That is, by the pulverizing step, the average particle size of the obtained carbonaceous material is adjusted to be 2 to 50 µm. Note that, in the present specification, "carbonaceous material precursor" refers to a material that has undergone de-tarring.

The pulverizing step can be performed anytime as long as the average particle size of the obtained carbonaceous material is adjusted to 2 to 50 µm; however, the pulverizing step can be performed after the liquid phase de-mineralizing step (1), after the de-tarring step (3), or after the heat treatment step (4).

The pulverizer used for pulverization is not particularly limited, and a jet mill, a ball mill, a hammer mill, a rod mill, or the like, for example, can be used, but a jet mill equipped with a classification function is preferable from the perspective that there is minimal fine powder generation. On the other hand, when a ball mill, a hammer mill, a rod mill, or the like is used, fine powder can be removed by performing classification after pulverization.

Examples of classification include classification with a sieve, wet classification, and dry classification. An example of a wet classifier is a classifier utilizing a principle such as gravitational classification, inertial classification, hydraulic classification, or centrifugal classification. An example of a dry classifier is a classifier utilizing a principle such as sedimentation classification, mechanical classification, or centrifugal classification.

In the pulverization step, pulverization and classification can be performed with a single apparatus. For example, pulverization and classification can be performed using a jet mill equipped with a dry classification function. Furthermore, an apparatus with an independent pulverizer and classifier can also be used. In this case, pulverization and classification can be performed continuously, but pulverization and classification may also be performed non-continuously.

Pulverized carbonaceous material precursor can be heat-treated by the heat treatment step. Since the pulverized carbonaceous material precursor is shrunk by approximately 0 to 20% depending on the condition of the heat treatment, for cases where the heat treatment step is performed, the average particle size of the pulverized carbonaceous material precursor is preferably adjusted to a size which is approximately 0 to 20% greater in order to obtain a carbonaceous material for non-aqueous electrolyte secondary battery negative electrodes having a final average particle size $D_{v50}$ of 2 to 50 µm. The average particle size after the pulverization is not limited as long as the final average particle size of the obtained carbonaceous material is from 2 to 50 µm; however, specifically, the average particle size $D_{v50}$ is preferably adjusted to 2 to 63 µm, more preferably 2 to 50 µm, even more preferably 2 to 38 µm, yet even more preferably 2 to 32 µm, and most preferably 3 to 25 µm.

In the method of producing the carbonaceous material, a carbon source is subjected to de-tarring to form a carbonaceous material precursor. Furthermore, heat treatment performed in order to modify a carbonaceous material precursor into carbonaceous material is called "heat treatment". One-stage heat treatment can be used, or two-stage heat treatment performed at a low temperature and a high temperature can be also used. In this case, the heat treatment at a low temperature is referred to as a pre-heat treatment, and the heat treatment at a high temperature is referred to as a final heat treatment. Note that, in the present specification, "non-carbonization heat treatment" refers to cases where the main purpose is neither to form a carbonaceous material precursor by removing volatile components from a carbon source nor to modify a carbonaceous material precursor into a carbonaceous material. Therefore, "non-carbonization heat treatment" is distinguished from "de-tarring" and "heat treatment".

3. De-Tarring Step

De-tarring is performed by heat treatment a carbon source at 300° C. or higher but 1000° C. or lower. Further preferably, de-tarring is performed at 500° C. or higher but lower than 900° C. De-tarring removes volatile components such as $CO_2$, CO, $CH_4$, and $H_2$, and the tar content, so that the generation of these components can be reduced and the burden of the furnace can be reduced in final heat treatment. When the de-tarring temperature is less than 300° C., de-tarring becomes insufficient, and the amount of tar or gas generated in the final heat treatment step after pulverization becomes large. This may adhere to the particle surface and cause a decrease in battery performance without being able to maintain the surface properties after pulverization, which is not preferable. On the other hand, when the de-tarring temperature is greater than 1000° C., the temperature exceeds the tar-generating temperature range, and the used energy efficiency decreases, which is not preferable. Furthermore, the generated tar causes a secondary decomposition reaction, and the tar adheres to the carbonaceous material precursor and causes a decrease in performance, which is not preferable.

De-tarring is performed in an inert gas atmosphere, and examples of the inert gas include nitrogen, argon, and the like. Furthermore, de-tarring can be performed under reduced pressure, for example, at a pressure of 10 kPa or less. The de-tarring time is not particularly limited but, for example, de-tarring can be performed for 0.5 to 10 hours, and preferably performed for 1 to 5 hours. Furthermore, the pulverizing step can be performed after the de-tarring.

4. Heat Treatment Step

In the method of producing the carbonaceous material used in the present invention, the heat treatment step is a step for heat treatment a pulverized carbonaceous material precursor at 1000° C. to 1500° C. The heat treatment step is preferably performed in a non-oxidizing gas atmosphere. In the technical field of the present invention, heat treatment at 1000° C. to 1500° C. is a heat treatment typically called "final heat treatment". In the heat treatment step, a pre-heat treatment can be performed prior to a final heat treatment as necessary.

The heat treatment can be performed in accordance with an ordinary heat treatment procedure, and a carbonaceous material for a non-aqueous electrolyte secondary battery negative electrode can be obtained by performing heat treatment. The heat treatment temperature is from 1000 to 1500° C. If the heat treatment temperature is less than 1000° C., a large amount of functional groups remain in the carbonaceous material, the value of H/C increases, and the irreversible capacity also increases due to a reaction with lithium. Therefore, it is not preferable. The lower limit of the heat treatment temperature in the present invention is 1000° C. or higher, more preferably 1100° C. or higher, and particularly preferably 1150° C. or higher. On the other hand, when the heat treatment temperature exceeds 1500° C., the selective orientation of the carbon hexagonal plane increases, and the discharge capacity decreases, which is not preferable. The upper limit of the heat treatment temperature in the present invention is 1500° C. or lower, more preferably 1450° C. or lower, and particularly preferably 1400° C. or lower.

The heat treatment is preferably performed in a non-oxidizing gas atmosphere. Examples of the non-oxidizing gas include helium, nitrogen, argon, and the like, and these may be used alone or as a mixture. The heat treatment may also be performed in a gas atmosphere in which a halogen gas such as chlorine is mixed with the non-oxidizing gas described above. The supplied amount of gas (circulated amount) is not limited; however, the supplied amount of gas is 1 mL/min or greater, preferably 5 mL/min or greater, and even more preferably 10 mL/min or greater, per 1 g of the carbon precursor that has undergone de-mineralizing. Furthermore, the heat treatment can be performed under reduced pressure at a pressure of 10 kPa or less, for example. The heat treatment time is not particularly limited; however, the heat treatment can be performed for 0.05 to 10 hours, preferably from 0.05 to 3 hours, and more preferably from 0.05 to 1 hour, in terms of the retention time in which the temperature is maintained at 1000° C. or greater. Furthermore, the pulverizing step can be performed after the heat treatment.

(Pre-Heat Treatment)

In the production method of the present invention, pre-heat treatment can be performed. The pre-heat treatment is performed by heat treatment a carbon source at 300° C. or greater but less than 900° C. Pre-heat treatment removes volatile components that remain even after the de-tarring step, such as $CO_2$, CO, $CH_4$, and $H_2$, and a tar content, so that the generation of these components can be reduced and the burden of the furnace can be reduced in final heat treatment. That is, in addition to the de-tarring step, the $CO_2$, CO, $CH_4$, $H_2$, or tar content can be further removed by the pre-heat treatment. When the pre-heat treatment temperature is less than 500° C., de-tarring becomes insufficient, and the amount of tar or gas generated in the final heat treatment step after pulverization becomes large. This may adhere to the particle surface and cause a decrease in battery performance without being able to maintain the surface properties after pulverization, which is not preferable. On the other hand, when the pre-heat treatment temperature is 900° C. or higher, the temperature exceeds the tar-generating temperature range, and the used energy efficiency decreases, which is not preferable. Furthermore, the generated tar causes a secondary decomposition reaction, and the tar adheres to the carbon precursor and causes a decrease in performance, which is not preferable.

Pre-heat treatment is performed in an inert gas atmosphere, and examples of the inert gas include nitrogen, argon, and the like. In addition, pre-heat treatment can be performed under reduced pressure at a pressure of 10 kPa or less, for example. The pre-heat treatment time is not particularly limited, but pre-heat treatment may be performed for 0.5 to 10 hours, for example, and is preferably performed for 1 to 5 hours. Furthermore, the pulverizing step can be performed after the pre-heat treatment. Pre-heat treatment removes volatile components that remain even after the de-tarring step, such as $CO_2$, CO, $CH_4$, and $H_2$, and a tar content, so that the generation of these components can be reduced and the burden of the furnace can be reduced in final heat treatment.

(Heat Treatment Using Halogen Gas-Containing Non-Oxidizing Gas)

In the method of producing the carbonaceous material used in the present invention, heat treatment or pre-heat treatment can be performed in a halogen gas-containing non-oxidizing gas. Examples of the halogen gas that is used include chlorine gas, bromine gas, iodine gas, and fluorine gas; however, chlorine gas is particularly preferable. Furthermore, substances such as $CCl_4$ and $Cl_2F_2$ that are capable of easily releasing halogen at high temperatures can be supplied using an inert gas as a carrier.

The heat treatment or pre-heat treatment using the halogen gas-containing non-oxidizing gas can be performed at a temperature of final heat treatment (1000 to 1500° C.); however, the heat treatment or pre-heat treatment can be also performed at a temperature lower than the final heat treatment (e.g. 300° C. to 1000° C.). The temperature range is preferably from 800 to 1400° C. The lower limit of the temperature is preferably 800° C., and more preferably 850° C. The upper limit of the temperature is preferably 1400° C., more preferably 1350° C., and most preferably 1300° C.

By, when carbonizing the raw organic material by heating, carbonizing a raw organic material via a step of heating the raw organic material in an atmosphere containing halogen gas such as chlorine gas, the resulting carbonaceous material will have adequate halogen content and, furthermore, a microstructure that is suitable for doping lithium. Thereby, a large charge/discharge capacity can be achieved. For example, compared to the case where heat treatment was performed while supplying nitrogen gas at 0.2 L/min, in the case where heat treatment was performed while supplying a mixed gas in which 0.04 L/min of chlorine gas had been added to 0.2 L/min of nitrogen gas, the discharging capacity was increased by 7% per 1 g of carbon precursor.

Although the halogen content in the carbonaceous material of the present invention that has been subjected to heat treatment using a halogen gas-containing non-oxidizing gas is not limited, the halogen content is from 50 to 10000 ppm, more preferably from 100 to 5000 ppm, and further preferably from 200 to 3000 ppm.

Although the reason why a carbonaceous material for non-aqueous electrolyte secondary battery negative electrodes having a large charge/discharge capacity can be obtained by performing heat treatment or pre-heat treatment using halogen gas-containing non-oxidizing gas is not clear, it is conceived that this is because a halogen and a hydrogen atom in the carbonaceous material react and carbonization proceeds in a state in which hydrogen has been rapidly removed from the carbonaceous material. Halogen gas is also conceived to react with minerals contained in the carbonaceous material and exhibit effects that reduce remaining minerals. Note that, if the halogen content contained in the carbonaceous material is too low, hydrogen cannot be sufficiently removed in the process of the production and, as a result, charge/discharge capacity may not be sufficiently enhanced. On the other hand, if the halogen content contained in the carbonaceous material is too high, it is possible to cause a problem of increasing irreversible capacity due to the remaining halogen being reacted with lithium in the battery.

[3] Binder

In the present invention, from the perspectives of reducing used amount of a binder and enhancing cycle characteristics of a secondary battery, a water-soluble polymer is preferably contained as a binder. As such a water-soluble polymer, a water-soluble polymer that can be dissolved in water can be used without any particular limitations. Specific examples thereof include cellulose-based compounds, polyvinyl alcohol, starch, polyacrylamide, poly(meth) acrylic acid, ethylene-acrylate copolymers, ethylene-acrylamide-acrylate copolymers, polyethyleneimine, and the like, and derivatives or salts thereof. Of these, cellulose-based compounds, polyvinyl alcohol, poly(meth)acrylic acid, and derivatives thereof are preferable. Furthermore, use of a carboxymethyl cellulose (CMC) derivative, polyvinyl alcohol derivative, and polyacrylate are further preferable. These may be used alone or as a combination of two or more types.

The mass average molecular weight of the water-soluble polymer used in the present invention is 10,000 or greater, more preferably 15,000 or greater, and even more preferably 20,000 or greater. The mass average molecular weight of less than 10,000 is not preferable because dispersion stability of an electrode mixture will be poor and/or the water-soluble polymer tends to leach out into an electrolyte solution. Furthermore, the mass average molecular weight of the water-soluble polymer is 6,000,000 or less, and more preferably 5,000,000 or less. The mass average molecular weight exceeding 6,000,000 is not preferable because the solubility in solvent will decrease.

In the present invention, water-insoluble polymer can be used together as the binder. These polymers are dispersed in an aqueous medium to form emulsion. Examples of preferable water-insoluble polymer include diene-based polymers, olefin-based polymers, styrene-based polymers, (meth)acrylate-based polymers, amide-based polymers, imide-based polymers, ester-based polymers, and cellulose-based polymers.

As another thermoplastic resin used as the binder of the negative electrode, any thermoplastic resin exhibiting binding effects and having durability against the non-aqueous electrolyte that is used and durability against electrochemical reaction at the negative electrode can be used without any particular limitations. Specifically, two components, the water-soluble polymers and emulsion, are often used. The water-soluble polymer is mainly used as a dispersibility imparting agent and/or a viscosity adjusting agent, and the emulsion is important for imparting binding properties between particles and imparting flexibility to the electrode.

Of these, preferable examples include homopolymers or copolymers of conjugated diene-based monomers or acrylic ester-based (including methacrylic ester-based) monomers. Specific examples thereof include polybutadiene, polyisoprene, polymethyl methacrylate, polymethyl acrylate, polyethyl acrylate, polybutyl acrylate, natural rubber, isoprene-isobutylene copolymers, styrene-1,3-butadiene copolymers, styrene-isoprene copolymers, 1,3-butadiene-isoprene-acrylonitrile copolymers, styrene-1,3-butadiene-isoprene copolymers, 1,3-butadiene-acrylonitrile copolymers, styrene-acrylonitrile-1,3-butadiene-methyl methacrylate copolymers, styrene-acrylonitrile-1,3-butadiene-itaconic acid copolymers, styrene-acrylonitrile-1,3-butadiene-methyl methacrylate-fumaric acid copolymers, styrene-1,3-butadiene-itaconic acid-methyl methacrylate-acrylonitrile copolymers, acrylonitrile-1,3-butadiene-methacrylic acid-methyl methacrylate copolymers, styrene-1,3-butadiene-itaconic acid-methyl methacrylate-acrylonitrile copolymers, styrene-n-butyl acrylate-itaconic acid-methyl methacrylate-acrylonitrile copolymers, styrene-n-butyl acrylate-itaconic acid-methyl methacrylate-acrylonitrile copolymers, 2-ethylhexyl acrylate-methyl acrylate-acrylic acid-methoxy polyethylene glycol monomethacrylate, and the like. In particular, of these, a polymer (rubber) having rubber elasticity is suitably used. Polyvinylidene fluoride (PVDF), polytetrafluoro ethylene (PTFE), and styrene-butadiene-rubber (SBR) are also preferable.

Furthermore, from the perspective of binding properties, preferable examples of the water-insoluble polymer include a water-insoluble polymer having a polar group, such as a carboxyl group, carbonyloxy group, hydroxyl group, nitrile group, carbonyl group, sulfonyl group, sulfoxyl group, and epoxy group. Particularly preferable examples of the polar group include a carboxyl group, carbonyloxy group, and hydroxyl group.

Proportion of the water-soluble polymer contained in the binder is preferably from 8 to 100% by mass. If the proportion is less than 8% by mass, the binder will be water insoluble and moisture absorption resistance will be enhanced; however, cycle durability of the battery will be insufficient.

[4] Non-Aqueous Electrolyte Secondary Battery Negative Electrode

The non-aqueous electrolyte secondary battery negative electrode of the present invention comprises the material for non-aqueous electrolyte secondary battery negative electrodes of the present invention.

(Production of Negative Electrode)

The negative electrode that uses the material for negative electrodes of the present invention can be produced by adding a binder to a mixture containing predetermined proportions of the carbonaceous material and the graphitic material, adding appropriate amount of suitable solvent, kneading to form an electrode mixture, coating the electrode mixture on a collector formed from metal plates or the like and drying, and then pressure-forming. An electrode having high conductivity can be produced by using the material for negative electrodes of the present invention without particularly adding a conductivity agent, but a conductivity agent may be added as necessary when preparing the electrode mixture for the purpose of imparting even higher conductivity. As the conductivity agent, conductive carbon black, vapor-grown carbon fibers (VGCF), nanotubes, or the like can be used. The added amount of the conductivity agent differs depending on the type of the conductivity agent that is used, but when the added amount is too small, the expected conductivity cannot be achieved, which is not preferable. Conversely, when the added amount is too large, dispersion of the conductivity agent in the electrode mixture becomes poor, which is not preferable. From this perspective, the proportion of the added amount of the conductivity agent is preferably from 0.5 to 10% by mass (here, it is assumed that the amount of the active material (carbonaceous material+graphitic material)+the amount of the binder+the amount of the conductivity agent=100% by mass), more preferably from 0.5 to 7% by mass, and particularly preferably from 0.5 to 5% by mass.

When the added amount of the binder is too large, since the resistance of the resulting electrode becomes large, the internal resistance of the battery becomes large. This diminishes the battery characteristics, which is not preferable. When the added amount of the binder is too small, the bonds between the negative electrode material particles and the bonds between the negative electrode material particles and the current collector become insufficient, which is not preferable. Preferable amount of the binder that is added differs depending on the types of a binder that is used, and when using a binder that uses water as a solvent, a plurality of binders is often mixed for use (e.g. a mixture of SBR and CMC). The total amount of all the binders that are used is preferably from 0.5 to 10% by mass, and more preferably from 1 to 8% by mass.

Any solvent can be used without any particular limitations as long as the solvent can dissolve the binder described above and suitably disperse the material for negative electrodes. For example, one type or two or more types selected from water, methyl alcohol, ethyl alcohol, propyl alcohol, N-methylpyrrolidone (NMP), or the like can be used.

The electrode active material layer is typically formed on both sides of the current collector, but the layer may be formed on one side as necessary. The number of required current collectors or separators becomes smaller as the thickness of the electrode active material layer increases, which is preferable for increasing capacity. However, it is more advantageous from the perspective of improving the input/output characteristics for the electrode area of opposite electrodes to be wider, so when the active material layer is too thick, the input/output characteristics are diminished, which is not preferable. The thickness of the active material layer (on each side) is preferably from 10 to 100 µm, more preferably from 20 to 75 µm, and particularly preferably from 20 to 60 µm.

[5] Non-Aqueous Electrolyte Secondary Battery

The non-aqueous electrolyte secondary battery of the present invention comprises the non-aqueous electrolyte secondary battery negative electrode of the present invention. A non-aqueous electrolyte secondary battery using the negative electrode for non-aqueous electrolyte secondary battery using the carbonaceous material of the present invention exhibits excellent output characteristics and cycle characteristics.

(Production of Non-Aqueous Electrolyte Secondary Battery)

When a negative electrode for a non-aqueous electrolyte secondary battery is formed using the negative electrode material of the present invention, the other materials constituting the battery such as the positive electrode material, separators, and the electrolyte solution are not particularly limited, and various materials that have been conventionally used or proposed for non-aqueous solvent secondary batteries can be used.

For example, layered oxide-based (as represented by $LiMO_2$, where M is a metal such as $LiCoO_2$, $LiNiO_2$, $LiMnO_2$, or $LiNi_xCo_yMn_zO_2$ (where x, y, and z represent composition ratios)), olivine-based (as represented by $LiMPO_4$, where M is a metal such as $LiFePO_4$), and spinel-based (as represented by $LiM_2O_4$, where M is a metal such as $LiMn_2O_4$) complex metal chalcogen compounds are preferable as positive electrode materials, and these chalcogen compounds may be mixed as necessary. A positive electrode is formed by coating these positive electrode materials with an appropriate binder together with a carbon material for imparting conductivity to the electrode and forming a layer on a conductive current collector.

A non-aqueous solvent electrolyte solution used with this positive electrode and negative electrode combination is typically formed by dissolving an electrolyte in a non-aqueous solvent. As the non-aqueous solvent, for example, one type or a combination of two or more types of organic solvents, such as ethylene carbonate (EC), dimethyl carbonate (DMC), and propylene carbonate (PC), can be used. Furthermore, $LiPF_6$, $LiBF_4$, $LiCF_3SO_3$, $LiAsF_6$, $LiN(CF_3SO_2)_2$, $LiC(CF_3SO_2)_3$, $LiCF_3(CF_2)_3SO_3$, or the like can be used as the electrolyte.

In the electrolyte solution used in the non-aqueous electrolyte secondary battery of the present invention, one type or two or more types of additives can be used together. A compound that can undergone reduction earlier than a non-aqueous organic solvent and be decomposed is preferable as the additive. In order to select such an additive, Lowest Unoccupied Molecular Orbital (LUMO) theory can be applied.

LUMO represents molecular orbital in which no electron fills the lowest energy level. When the molecule accepts an electron, this energy level is filled with the electron, and from this value, degree of reduction is determined. Lower the LUMO value, reductivity will be higher, and higher the LUMO value, the reduction resistance will be excellent.

The LUMO value of the compound that is added to the electrolyte solution was determined by the Austin Model 1 (AM1) calculation method of semi-empirical calculation method which is one of the calculation methods in quantum chemistry.

The semi-empirical calculation methods are classified into AM1, Parametric method 3 (PM3), Modified Neglect of Differential Overlap (MNDO), Complete Neglect of Differential Overlap (CNDO), Intermediate Neglect of Differential Overlap (INDO), Modified Intermediate Neglect of Differential Overlap (MINDO), and the like depending on assumptions and types of parameters. The AM1 calculation method was developed by Dewer et al. in 1985 by improving some parts of MNDO method so that the calculation method becomes more suited for hydrogen bond calculation. In the present invention, the AM1 method was performed by using Gaussian 03 (Gaussian, Inc.), a computer program package; however, the AM1 method is not limited to this.

Operational procedure for calculating the LUMO value using Gaussian03 will be described below. For molecular structure modeling that was performed prior to calculation, the visualizing feature included in GaussView 3.0, a visualizing program, was used. Molecular structure was created, and the structure was optimized using the following settings: AM1 model Hamiltonian, "Ground State"; charge "0"; spin "Singlet"; and solvent effect "N/A". Thereafter, a single point energy calculation was performed for the same level. A structure having the smallest total energy of electrons obtained by structure optimization was treated as the most stable structure. A numerical value corresponding to the lowest unoccupied molecular orbital in this molecular structure was used as the LUMO value. Since the unit of the result is in atomic unit. Atomic unit was converted to electron volt using 1 a.u.=27.2114 eV.

In the additive of the present invention, the LUMO value determined by the AM1 calculation method of quantum chemistry calculation method is from −1.1 to 1.11 eV, more preferably from −0.6 to 1.0 eV, and even more preferably from 0 to 1.0 eV. The LUMO value of 1.11 eV or greater is not preferable because the additive may not serve as an additive. On the other hand, the LUMO value of −1.1 eV or less is not preferable because the additive may cause a side reaction on the positive electrode side.

Examples of the additive having the LUMO value of −1.1 to 1.11 eV include fluoroethylene carbonate (FEC; 0.9829 eV), lithium tetrafluoroborate ($LiBF_4$; 0.2376 eV), chloroethylene carbonate (ClEC; 0.1056 eV), trimethylsilyl phosphate (TMSP; 0.415 eV), propane sultone (PS; 0.0656 eV), ethylene sulfite (ES; 0.0248 eV), vinylene carbonate (VC; 0.0155 eV), vinylethylene carbonate (VEC; −0.5736 eV), dioxathiolane dioxide (DTD; −0.7831 eV), lithium bis(oxalato)borate (LiBOB; −1.0427 eV), and the like; however, the additive is not limited to these.

The content of the additive described above in the electrolyte solution is preferably from 0.1 to 6% by mass, and more preferably from 0.2 to 5% by mass. If the content is less than 0.1% by mass, since a film that is originated from reductive decomposition of the additive cannot be formed sufficiently, cycle characteristics at high temperatures will not be enhanced. If the content is greater than 6% by mass, since a thick film is formed on the active materials of negative electrode, resistance will be large and input/output characteristics will decrease.

[6] Vehicle

The lithium secondary battery of the present invention is suitable for a battery that is mounted on vehicles such as automobiles (typically, lithium secondary battery for driving vehicle).

"Vehicle" in the present invention can be, without any particular limitations, a vehicle known as a typical electric vehicle, a hybrid vehicle of a fuel cell and an internal-combustion engine, or the like; however, the vehicle in the present invention is a vehicle that comprises at least: a power source device provided with the battery described above, a motor driving mechanism driven by the power supply from the power source device, and a control device that controls this. Furthermore, the vehicle may comprise a mechanism having a dynamic braking and/or a regenerative brake that charges the lithium secondary battery by converting the energy generated by braking into electricity.

EXAMPLES

The present invention will be described in detail hereinafter using working examples, but these working examples do not limit the scope of the present invention.

The measurement methods for the physical properties of the material for non-aqueous secondary battery negative electrodes according to the present invention ("average particle size as determined by laser diffraction", "atom ratio (H/C) of hydrogen/carbon", "specific surface area", "mineral content", "true density determined by pycnometer method using butanol (hereinafter, referred to as "butanol method")", "true density determined by dry density measurement method using helium (hereinafter, referred to as "helium method")", and "average interlayer spacing $d_{002}$ of carbon material") will be described hereinafter, but the physical properties of the carbonaceous material or the graphitic material described in this specification (including examples) are based on values determined by the following methods.

(Average Particle Size as Determined by Laser Diffraction)

Three drops of a dispersant (cationic surfactant, "SN-WET 366" (manufactured by San Nopco Limited)) were added to approximately 0.01 g of a sample, and the dispersant was blended into the sample. Next, 30 mL of pure water was added, and after the pure water was dispersed for approximately 2 minutes with an ultrasonic washer, the particle size distribution within the particle size range of 0.5 to 3000 μm was determined with a particle size distribution measurement device ("SALD-3000S" manufactured by the Shimadzu Corporation). The refractive index of the particle was assumed to be 2.0 to 0.1i. The average particle size $D_{v50}$ (μm) was determined from the resulting particle size distribution as the particle size yielding a cumulative volume of 50%.

(Atom Ratio of Hydrogen/Carbon (H/C))

The atom ratio was measured in accordance with the method prescribed in JIS M8819. That is, each of the mass proportions of hydrogen and carbon in a sample obtained by elemental analysis using a CHN analyzer (2400II manufactured by Perkin Elmer Inc.) was divided by the mass of each element, and then the ratio of the numbers of hydrogen/carbon atoms was determined.

(Specific Surface Area)

The specific surface area (SSA) was measured in accordance with the method stipulated in JIS Z8830. A summary is given below. A value $v_m$ was determined by a one-point method (relative pressure x=0.2) based on nitrogen adsorption at the temperature of liquid nitrogen using the approximation $v_m=1/(v(1-x))$ derived from the BET equation, and the specific surface area of the sample was calculated from the following formula:

Specific surface area (SSA)=$4.35 \times v_m$ (m²/g)

(Here, $v_m$ is the amount of adsorption (cm³/g) required to form a monomolecular layer on the sample surface; v is the amount of adsorption (cm³/g) actually measured, and x is the relative pressure).

Specifically, the amount of adsorption of nitrogen in the carbonaceous material at the temperature of liquid nitrogen was measured as follows using a "Flow Sorb II 2300" manufactured by Micromeritics. A test tube was filled with the carbon material, and the test tube was cooled to −196° C. while infusing helium gas containing nitrogen gas at a concentration of 20 mol % so that the nitrogen was adsorbed in the carbon material. Next, the test tube was returned to room temperature. The amount of nitrogen desorbed from the sample at this time was measured with a thermal conductivity detector and used as the adsorption gas amount v.

(Mineral Content)

In order to measure the potassium element content and the calcium content, a carbon sample containing predetermined amounts of potassium element and calcium element is prepared in advance, and then calibration curves showing the relationship between the intensity of Kα line of potassium and the potassium content, and the relationship between the intensity of Kα line of calcium and the calcium content were created using an X-ray fluorescence spectrometer. Then, the intensity of the Kα line of potassium and the intensity of the Kα line of calcium of the sample were measured via X-ray fluorescence analysis. Using the calibration curves created in advance, content of potassium and content of calcium were determined.

The X-ray fluorescence analysis was performed using LAB CENTER XRF-1700, manufactured by Shimadzu Corporation, under the following conditions. A holder for irradiated from upper part was used, and the measured area of the sample was within a circumferential line having the diameter of 20 mm. In a polyethylene container having the inner diameter of 25 mm, 0.5 g of a sample to be measured was placed, the back side thereof was covered with a plankton net and the measurement surface thereof was covered with a polypropylene film in order to set the sample to be measured, and then the measurement was performed. The X-ray source was set to 40 kV and 60 mA. Potassium was measured using an LiF(200) as an analyzing crystal and a gas flow proportional counter as a detector, in a range of 2θ of 90 to 140°, at a scanning rate of 8°/min. Calcium was measured using an LiF(200) as an analyzing crystal and a scintillation counter as a detector, in a range of 2θ of 56 to 60°, at a scanning rate of 8°/min.

(True Density Determined by Butanol Method)

Measurements were performed using butanol in accordance with the method stipulated in JIS R7212. A summary is given below. The mass ($m_1$) of a pycnometer with a bypass line having an internal volume of approximately 40 mL was precisely measured. Next, after a sample was placed flat at the bottom of the pycnometer so as to have a thickness of approximately 10 mm, the mass ($m_2$) was precisely measured. Next, 1-butanol was slowly added to the pycnometer to a depth of approximately 20 mm from the bottom. Next, the pycnometer was gently oscillated, and after it was confirmed that no large air bubbles were formed, the pycnometer was placed in a vacuum desiccator and gradually evacuated to a pressure of 2.0 to 2.7 kPa. The pressure was maintained for 20 minutes or longer, and after the generation of air bubbles stops, the pycnometer was removed and further filled with 1-butanol. After a stopper was inserted, the pycnometer was immersed in a constant-temperature water bath (adjusted to 3.0±0.03° C.) for at least 15 minutes, and the liquid surface of 1-butanol was aligned with the marked line. Next, the pycnometer was removed, and after the outside of the pycnometer was thoroughly wiped and the pycnometer was cooled to room temperature, the mass ($m_4$) was precisely measured. Next, the same pycnometer was filled with 1-butanol and immersed in a constant-temperature water bath in the same manner as described above. After the marked line was aligned, the mass ($m_3$) was measured. In addition, distilled water which was boiled immediately before use and from which the dissolved gas was removed was placed in the pycnometer and immersed in a constant-temperature water bath in the same manner as described above. After the marked line was aligned, the mass ($m_5$) was measured. The true density ($\rho_B$) was calculated using the following formula, and this was used as $\rho_{Bt}$.

$$\rho_{Bt} = \frac{m_2 - m_1}{m_2 - m_1 - (m_4 - m_3)} \times \frac{m_3 - m_1}{m_5 - m_1} d \quad \text{[Formula 1]}$$

(Here, d is the specific gravity (0.9946) in water at 30° C.)
(True Density Determined by Helium Method)

Measurement of $\rho_H$ was performed by using Full-Automatic Gas Displacement Pycnometer AccuPyc 1330, manufactured by Shimadzu Corporation. Sample was dried in advance at 200° C. for 5 hours or longer and then measured. In a cell of 10 cm$^3$, 1 g of sample was placed, and the ambient temperature of 23° C. was used. The number of purging was 5 times, and an average value obtained by averaging 5 samples, when it was confirmed that volume values obtained by repeated measurements were identical within a deviation of 0.5%, was used as $\rho_H$.

The measurement device has a sample chamber and an expansion chamber, and the sample chamber has a pressure gauge to measure the pressure inside the sample chamber. The sample chamber and the expansion chamber are connected via a connection tube provided with a valve. A helium gas introduction tube having a stop valve is connected to the sample chamber, and a helium gas discharging tube having a stop valve is connected to the expansion chamber. Specifically, the measurement was performed as described below.

The volume of the sample chamber ($V_{CELL}$) and the volume of the expansion chamber ($V_{EXP}$) are measured in advance using a calibration sphere having a known volume. A sample is placed in the sample chamber, and then the system is filled with helium and the pressure in the system at this time is $P_a$. Then, the valve is closed, and helium gas is introduced only to the sample chamber in order to increase the pressure thereof to pressure $P_1$. Then, the valve is opened to connect the expansion chamber and the sample chamber, the pressure within the system decreases to the pressure $P_2$ due to expansion. The volume of the sample ($V_{SAMP}$) at this time is calculated by the following formula.

$$V_{SAMP} = V_{CELL} - [V_{EXP}/\{(P_1 - P_a)/(P_2 - P_a) - 1\}] \quad \text{[Formula 2]}$$

Therefore, when the mass of the sample is $W_{SAMP}$, the density can be obtained as described below.

$$\rho_H = W_{SAMP}/V_{SAMP} \quad \text{[Formula 3]}$$

(Average interlayer spacing $d_{002}$ of carbon material)

A sample holder was filled with a carbonaceous material powder, and measurements were performed with a symmetrical reflection method using an X'Pert PRO made by the PANalytical B.V. Under conditions with a scanning range of 8<2θ<50° and an applied current/applied voltage of 45 kV/40 mA, an X-ray diffraction pattern was obtained using CuKα rays (λ=1.5418 Å) monochromated by an Ni filter as a radiation source. The correction was performed by using the diffraction peak of the (111) surface of a high-purity silicon powder serving as a standard substance. The wavelength of the CuKα rays was set to 0.15418 nm, and $d_{002}$ was calculated by Bragg's equation.

(Preparation of Carbonaceous Material)

In the present working example, coffee bean residue is formed into a carbonaceous material by the method described below, and mixed with natural graphite at a predetermined proportion to make a carbonaceous material powder for negative electrodes. The carbonaceous material powder whose raw material is a plant-derived organic material is produced by the method described below.

<Carbonaceous Material 1>

First, in 100 g of coffee residue after extraction (moisture content: 65%), 300 g of 1% hydrochloric acid was added, stirred for 1 hour at 20° C., and then filtered. Next, de-mineralizing treatment was performed by repeating, for 3 times, a water washing operation in which 300 g of 20° C. water was added to the mixture and stirred for 1 hour, and then the mixture was filtered. After drying the treated sample in a nitrogen gas atmosphere, the sample was subjected to de-tarring at 700° C. and pre-carbonized. Subsequently, the sample was pulverized using a rod mill to obtain carbon precursor microparticles. Thereafter, the carbon precursor was placed in a horizontal tubular furnace and carbonized by maintaining at 1250° C. for 1 hour while nitrogen gas was circulated, and the carbonaceous material 1 was obtained. Physical properties of the obtained carbonaceous material is shown in Table 1.

<Carbonaceous Material 2>

The carbonaceous material 2 was obtained in the same manner as was the carbonaceous material 1 except for using a coffee residue obtained by extracting Brazilian coffee beans (*Arabica* variety) with different degree of roasting. Characteristics of the obtained carbonaceous material is shown in Table 1.

<Carbonaceous Material 3>

The carbonaceous material 3 was obtained in the same manner as was the carbonaceous material 1 except for using a coffee residue obtained by extracting Vietnamese coffee beans (*Canephora* variety). Characteristics of the obtained carbonaceous material is shown in Table 1.

<Carbonaceous Material 4>

The carbonaceous material 4 was obtained in the same manner as was the carbonaceous material 1 except for changing the de-mineralizing treatment temperature to 70° C. Characteristics of the obtained carbonaceous material is shown in Table 1.

<Comparative Carbonaceous Material 1>

Coconut shell char was pre-heat treatment at 600° C. for 1 hour in a nitrogen gas atmosphere (ordinary pressure) and then pulverized to obtain powdered carbon precursors having an average particle size of 10 μm. Then, a washing operation in which the powdered carbon precursors were immersed in 35% hydrochloric acid for 1 hour and then washed in a boiled water for 1 hour was repeated for twice to perform de-mineralizing treatment, and de-mineralized powder carbon precursors were obtained. Thereafter, 10 g of the obtained de-mineralized powder carbon precursors was placed in a horizontal tubular furnace and carbonized by maintaining at 1250° C. for 1 hour while nitrogen gas was circulated, and the comparative carbonaceous material 1 was obtained. Characteristics of the obtained comparative carbonaceous material 1 is shown in Table 1.

<Comparative Carbonaceous Material 2>

Petroleum-based oxidized pitch was subjected to detarring at 600° C. in a nitrogen gas atmosphere (ordinary pressure) and preliminarily carbonized. Thereafter, the sample was pulverized using a rod mill to obtain powdered carbon precursors having an average particle size of 10 μm. Then, the powder carbon precursors was placed in a horizontal tubular furnace and heat-treated at 1200° C. for 1 hour while nitrogen gas was circulated, and the comparative carbonaceous material 2 was obtained. Physical properties of the obtained comparative carbonaceous material 2 is shown in Table 1.

<Comparative Carbonaceous Material 3>

Natural graphite produced in Luoyang in China that has undergone spheroidizing treatment (average particle size: 24 μm) was used. Physical properties of the used comparative carbonaceous material 3 is shown in Table 1.

ible capacity (non-de-doping capacity) of the battery active material without being affected by fluctuation in the performances of the counter electrode, a lithium secondary battery was formed using the electrode obtained above together with a counter electrode comprising lithium metal with stable characteristics, and the characteristics thereof were evaluated.

The lithium electrode was prepared inside a glove box in an Ar atmosphere. An electrode (counter electrode) was formed by spot-welding a stainless steel mesh disc with a diameter of 16 mm on the outer lid of a 2016 type coin test cell in advance, punching a thin sheet of metal lithium with a thickness of 0.8 mm into a disc shape with a diameter of 15 mm, and pressing the thin sheet of metal lithium into the stainless steel mesh disc.

Using a pair of electrodes produced in this way, $LiPF_6$ was added at a proportion of 1.5 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine porous membrane separator made of borosilicate glass fibers with a diameter of 19 mm to assemble a 2016 coin-type non-aqueous electrolyte lithium secondary battery in an Ar glove box.

TABLE 1

| Raw materials | K [ppm] | Ca [ppm] | $Dv_{50}$ [μm] | $d_{002}$ [nm] | H/C | $\rho_{Bt}$ [g/cm$^3$] | $\rho_H$ [g/cm$^3$] | $\rho_H/\rho_{Bt}$ | SSA [m$^2$/g] |
|---|---|---|---|---|---|---|---|---|---|
| Carbonaceous material 1 | N.D. | N.D. | 9.8 | 0.378 | 0.02 | 1.57 | 1.88 | 1.19 | 6.2 |
| Carbonaceous material 2 | N.D. | N.D. | 9.7 | 0.379 | 0.02 | 1.60 | 1.93 | 1.21 | 5.7 |
| Carbonaceous material 3 | N.D. | N.D. | 7.8 | 0.379 | 0.02 | 1.54 | 2.01 | 1.31 | 6.7 |
| Carbonaceous material 4 | N.D. | N.D. | 7.8 | 0.379 | 0.02 | 1.58 | 1.87 | 1.18 | 5.1 |
| Comparative carbonaceous material 1 | 40 | 170 | 10.0 | 0.383 | 0.02 | 1.47 | 2.13 | 1.45 | 5.9 |
| Comparative carbonaceous material 2 | N.D. | N.D. | 9.0 | 0.380 | 0.01 | 1.52 | 2.08 | 1.37 | 6.0 |
| Comparative carbonaceous material 3 | N.D. | N.D. | 24.0 | 0.336 | — | 2.26 | 2.26 | 1.00 | 6.0 |

(Doping/De-Doping Test of Active Material)

(a) Production of Electrode

The carbonaceous material powder whose raw material is the plant-derived organic material described above and natural graphite were mixed in the manner such that the proportion of the natural graphite is 20% by mass. An electrode was produced using this according to the method described below. In 96 parts by mass of carbon material, 3 parts by mass of styrene butadiene rubber, and 1 part by mass of carboxymethyl cellulose (CMC), ultrapure water was added to make the mixture paste-like, and the mixture was coated uniformly on a copper foil. After the sample was dried, the sample was punched from the copper foil into a disc shape with a diameter of 15 mm, and pressed to obtain an electrode (in the cases of carbonaceous materials 1 to 4, 5.2 MPa; and in the cases of comparative carbonaceous materials, 1.0 MPa). The amount of the carbon material in the electrode was adjusted to approximately 10 mg.

(b) Production of Test Battery

Although the carbon material of the present invention is suitable for forming a negative electrode for a non-aqueous electrolyte secondary battery, in order to precisely evaluate the discharge capacity (de-doping capacity) and the irrevers- (c) Measurement of Battery Capacity Charge-discharge tests were performed on a lithium secondary battery with the configuration described above using a charge-discharge tester ("TOSCAT" manufactured by Toyo System Co., Ltd.). A lithium doping reaction for inserting lithium into the carbon electrode was performed with a constant-current/constant-voltage method, and a de-doping reaction was performed with a constant-current method. Here, in a battery using a lithium chalcogen compound for the positive electrode, the doping reaction for inserting lithium into the carbon electrode is called "charging", and in a battery using lithium metal for a counter electrode, as in the test battery of the present invention, the doping reaction for the carbon electrode is called "discharging". The manner in which the doping reactions for inserting lithium into the same carbon electrode thus differs depending on the pair of electrodes used. Therefore, the doping reaction for inserting lithium into the carbon electrode will be described as "charging" hereinafter for the sake of convenience. Conversely, "discharging" refers to a charging reaction in the test battery but is described as "discharging" for the sake of convenience since it is a de-doping reaction for removing lithium from the carbon material. The charging method used here is a constant-current/constant-voltage method. Specifically, constant-current charging was performed at 0.5 mA/cm² until the terminal voltage reached 0 mV. After the terminal voltage reached 0 mV, constant-voltage charging was performed at a terminal voltage of 0 mV, and charging was continued until the current value reached 20 μA. At this time, a value determined by dividing the electricity supply by the mass of the carbon material of the electrode is defined as the charge capacity per unit mass of the carbon material (mAh/g). After the completion of charging, the battery circuit was opened for 30 minutes, and discharging was performed thereafter. Discharging was performed at a constant current of 0.5 mA/cm² until the final voltage reached 1.5 V. At this time, a value determined by dividing the electrical discharge by the mass of the carbon material of the electrode is defined as the discharge capacity per unit mass of the carbon material (mAh/g). The irreversible capacity was calculated as the discharge capacity subtracted from the charge capacity. The charge/discharge capacity and irreversible capacity were determined by averaging 3 measurements for test batteries produced using the same sample.

(d) Electrode Exposure Test

The electrode produced using the configuration described above was left at 25° C., 50% RH, in air for 1 week. Production of the test batteries and measurement of the battery capacities were performed in the same manner as in the test prior to exposure except for using the electrode after exposure as a test electrode.

(Method of Producing Cell for Measuring Direct Current Resistance)

Next, NMP was added to 94 parts by mass of lithium cobaltate (LiCoO₂, "Cellseed C-5H" manufactured by Nippon Chemical Industrial Co., Ltd.), 3 parts by mass of carbon black, and 3 parts by mass of polyvinylidene fluoride (KF#1300 manufactured by Kureha Corporation). This was formed into a paste and then applied uniformly to aluminum foil. After the sample was dried, the coated electrode was punched into a disc with a diameter of 14 mm. Here, the amount of lithium cobaltate in the positive electrode was adjusted so as to achieve 95% of the charge capacity of the negative electrode active material measured in (d). The electric capacity of lithium cobaltate was calculated as 150 mAh/g.

Using a pair of electrodes produced in this way, LiPF₆ was added at a proportion of 1.5 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine porous membrane separator made of borosilicate glass fibers with a diameter of 17 mm to assemble a 2032 coin-type non-aqueous electrolyte lithium secondary battery in an Ar glove box.

(Method of Measuring Direct Current Resistance)

First, the sample was aged by repeating two cycles of charging and discharging. Conversion of current value of the aging into C-rate (C is a time rate) was calculated using the electric capacity and mass of the lithium cobaltate that is stipulated earlier. Charging was performed by constant-current/constant-voltage. Charging conditions were the following: charging was performed at a rate of 0.2C until the voltage reached 4.2 V, then the current value was attenuated to maintain the voltage at 4.2 V, and charging was continued until the current value reached a rate of (1/100)C. After the completion of charging, the battery circuit was opened for 30 minutes, and discharging was performed thereafter. Discharging in Working Example 1 was continued until the battery voltage reached 2.75 V at a rate of 0.2C. Discharging of Comparative Example 3 was performed at a rate of 0.2C until the battery voltage reached 3.00 V. In the second charging/discharging, the current value at a rate of 0.4C was used in each example.

Next, until the battery capacity reached SOC (state of charge) of 40%, the battery was charged at a rate of 0.2C. Thereafter, pulse charging/discharging was performed in a low temperature thermostat (−10° C. atmosphere). Conversion of current value of the pulse charging/discharging into C-rate was calculated using the amount of discharging of the second aging. The pulse charging/discharging was measured at a constant current, and a cycle of charging the battery for 10 seconds and then opening the battery circuit for 600 seconds, and discharging the battery for 10 seconds and then opening the battery circuit for 600 seconds was used as 1 set. The pulse charging/discharging measurement was performed using each of the following current: 0.5C, 1.0C, and 2.0C. Change of voltages at discharging in each of the current was plotted. Slope of the linear approximation of the plot was calculated as the direct current resistance value.

(Test Results)

Table 2 shows charge/discharge characteristics of batteries using a mixed electrode of carbonaceous material powder and natural graphite, charge/discharge characteristics of batteries after exposure test, and relative values of direct current resistance.

TABLE 2

| | | Before exposure | | | After exposure | | |
|---|---|---|---|---|---|---|---|
| | | Discharge capacity | Irreversible capacity | Efficiency | Discharge capacity | Irreversible capacity | Efficiency |
| | Raw materials | mAh/g | | % | mAh/g | | % |
| Working Example 1 | Carbonaceous material 1/graphite | 434 | 62 | 87 | 431 | 60 | 88 |
| Working Example 2 | Carbonaceous material 2/graphite | 435 | 61 | 88 | 432 | 59 | 88 |
| Working Example 3 | Carbonaceous material 3/graphite | 448 | 67 | 87 | 445 | 66 | 87 |
| Working Example 4 | Carbonaceous material 4/graphite | 426 | 62 | 87 | 423 | 60 | 88 |

TABLE 2-continued

| | Raw materials | | | | | |
|---|---|---|---|---|---|---|
| Comparative Example 1 | Comparative carbonaceous material 1/graphite | 377 | 72 | 84 | 344 | 83 | 81 |
| Comparative Example 2 | Comparative carbonaceous material 2/graphite | 406 | 66 | 85 | 406 | 71 | 85 |
| Comparative Example 3 | Comparative carbonaceous material 3 (graphite) | 364 | 23 | 94 | 363 | 25 | 94 |

| | Raw materials | Increase in irreversible capacity mAh/g | Relative value of direct current resistance (−10° C.) |
|---|---|---|---|
| Working Example 1 | Carbonaceous material 1/graphite | −2 | 78.0 |
| Working Example 2 | Carbonaceous material 2/graphite | −2 | 78.6 |
| Working Example 3 | Carbonaceous material 3/graphite | −1 | 77.9 |
| Working Example 4 | Carbonaceous material 4/graphite | −2 | 78.2 |
| Comparative Example 1 | Comparative carbonaceous material 1/graphite | 11 | — |
| Comparative Example 2 | Comparative carbonaceous material 2/graphite | 6 | — |
| Comparative Example 3 | Comparative carbonaceous material 3 (graphite) | 2 | 100 |

By using a graphitic material and a non-graphitizable carbon material that is obtained by carbonizing a plant-derived organic material of the present invention together as a material used in an electrode, deterioration of charge/discharge characteristics before and after the exposure test can be suppressed, and electric capacity of a lithium secondary battery can be increased while maintaining a low resistance.

The invention claimed is:

1. A material for non-aqueous electrolyte secondary battery negative electrodes comprising a negative electrode active material, the negative electrode active material comprising a mixture of a carbonaceous material and a graphitic material;
   the carbonaceous material being a carbonaceous material obtained by carbonizing a plant-derived organic material, and having a potassium content of 0.5% by mass or less, an average particle size $D_{v50}$ of 2 μm or greater but 50 μm or less, an average interlayer spacing of (002) plane determined by powder X-ray diffraction of 0.365 nm or greater but 0.400 nm or less, an atomic ratio (H/C) of hydrogen atoms to carbon atoms determined by elemental analysis of 0.1 or less, and a true density determined by a pycnometer method using butanol of 1.51 g/cm³ or greater but 1.65 g/cm³ or less; and
   the graphitic material having an average interlayer spacing determined by powder X-ray diffraction of 0.345 nm or less, and a true density determined by a pycnometer method using butanol of 1.9 g/cm³ or greater.

2. The material for non-aqueous electrolyte secondary battery negative electrodes according to claim 1, wherein a calcium content of the carbonaceous material is 0.02% by mass or less.

3. The material for non-aqueous electrolyte secondary battery negative electrodes according to claim 1, wherein the plant-derived organic material contains coffee bean-derived organic material.

4. The material for non-aqueous electrolyte secondary battery negative electrodes according to claim 1, wherein the carbonaceous material has a ratio ($\rho_H/\rho_{Bt}$) of the true density determined by the butanol method ($\rho_{Bt}$) to a true density determined by a dry density measurement method using helium ($\rho_H$) of 1.18 or greater but 1.38 or less.

5. A negative electrode for non-aqueous electrolyte secondary batteries comprising the material for non-aqueous electrolyte secondary battery negative electrodes described in claim 1.

6. The negative electrode for non-aqueous electrolyte secondary batteries according to claim 5, further comprising a water-soluble polymer.

7. The negative electrode for non-aqueous electrolyte secondary batteries according to claim 6, wherein the water-soluble polymer is a polymer containing conjugated diene or acrylic ester as a constituent unit.

8. The negative electrode for non-aqueous electrolyte secondary batteries according to claim 6, wherein the water-soluble polymer is a carboxymethyl cellulose derivative, a polyvinyl alcohol derivative, or a polyacrylate.

9. A non-aqueous electrolyte secondary battery comprising the negative electrode for non-aqueous electrolyte secondary batteries described in claim 5.

10. The non-aqueous electrolyte secondary battery according to claim 9, further comprising, in an electrolyte solution, an additive having a value of LUMO, determined by AM1 calculation method of quantum chemical calculation methods, in a range of −1.1 eV or greater but 1.11 eV or less.

11. The non-aqueous electrolyte secondary battery according to claim 10, wherein the additive is vinylene carbonate, fluoroethylene carbonate, trimethylsilyl phosphate, lithium tetrafluoroborate, chloroethylene carbonate, propane sultone, ethylene sulfite, dioxathiolane dioxide, or lithium bis(oxalato)borate.

12. A vehicle on which the non-aqueous electrolyte secondary battery described in claim 9 is mounted.

\* \* \* \* \*